United States Patent
Park et al.

(10) Patent No.: US 10,283,766 B2
(45) Date of Patent: May 7, 2019

(54) NEGATIVE ELECTRODE ACTIVE MATERIAL FOR LITHIUM SECONDARY BATTERY

(71) Applicant: ILJIN ELECTRIC CO., LTD., Hwaseong (KR)

(72) Inventors: Cheol Ho Park, Gwangmyeong (KR); Seon Kyong Kim, Seoul (KR); Seung Chul Lee, Seoul (KR); Young Pil Choi, Chungju (KR); Hyang Yeon Kim, Seoul (KR); Jae Woong Kim, Daejeon (KR); Min Seok Sung, Hwaseong (KR)

(73) Assignee: ILJIN ELECTRIC CO., LTD., Hwaseong (KR)

( * ) Notice: Subject to any disclaimer, the term of this patent is extended or adjusted under 35 U.S.C. 154(b) by 221 days.

(21) Appl. No.: 15/109,394

(22) PCT Filed: Dec. 9, 2014

(86) PCT No.: PCT/KR2014/012088
§ 371 (c)(1),
(2) Date: Jun. 30, 2016

(87) PCT Pub. No.: WO2015/108281
PCT Pub. Date: Jul. 23, 2015

(65) Prior Publication Data
US 2016/0329561 A1  Nov. 10, 2016

(30) Foreign Application Priority Data

Jan. 20, 2014 (KR) .................. 10-2014-0006829

(51) Int. Cl.
C22C 28/00 (2006.01)
H01M 10/0525 (2010.01)
H01M 4/04 (2006.01)
H01M 4/134 (2010.01)
H01M 4/38 (2006.01)
(Continued)

(52) U.S. Cl.
CPC ............. *H01M 4/386* (2013.01); *C22C 1/002* (2013.01); *C22C 28/00* (2013.01); *C22C 45/00* (2013.01); *H01M 4/0471* (2013.01); *H01M 4/134* (2013.01); *H01M 10/0525* (2013.01); *H01M 10/052* (2013.01); *H01M 2004/027* (2013.01); *H01M 2220/30* (2013.01)

(58) Field of Classification Search
CPC .............................. H01M 4/386; C22C 1/002
See application file for complete search history.

(56) References Cited

U.S. PATENT DOCUMENTS

2014/0370386 A1* 12/2014 Hirono .................. H01M 4/386
429/220

FOREIGN PATENT DOCUMENTS

EP  2600446 A1  6/2013
JP  2010-009837  1/2010
(Continued)

*Primary Examiner* — Colin W. Slifka
(74) *Attorney, Agent, or Firm* — Patent Office of Dr. Chung Park

(57) ABSTRACT

A negative electrode active material for a lithium secondary battery according to an exemplary embodiment of the present invention includes an alloy containing silicon (Si), titanium (Ti), and iron (Fe), wherein the degree of amorphization of the alloy is raised by 40% or more by further adding copper (Cu) to the alloy.

2 Claims, 12 Drawing Sheets

(51) Int. Cl.
*C22C 1/00* (2006.01)
*C22C 45/00* (2006.01)
*H01M 10/052* (2010.01)
*H01M 4/02* (2006.01)

(56) References Cited

FOREIGN PATENT DOCUMENTS

| | | |
|---|---|---|
| JP | 2010-9837 A | 1/2010 |
| JP | 2011-070779 | 4/2011 |
| JP | 2011-70779 A | 4/2011 |
| JP | 2013-179033 | 9/2013 |
| KR | 10-2000-0052362 | 8/2000 |
| KR | 10-2012-0012265 | 2/2012 |

* cited by examiner

[FIG. 1A]
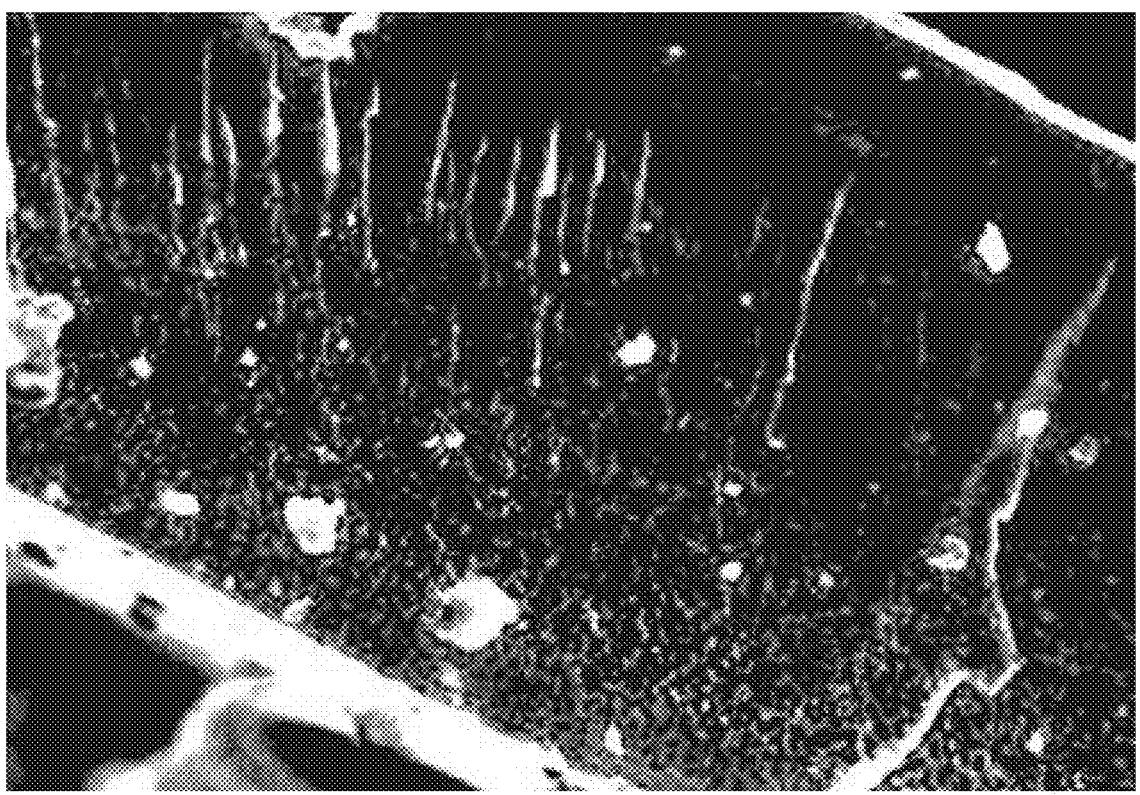

[FIG. 1B]
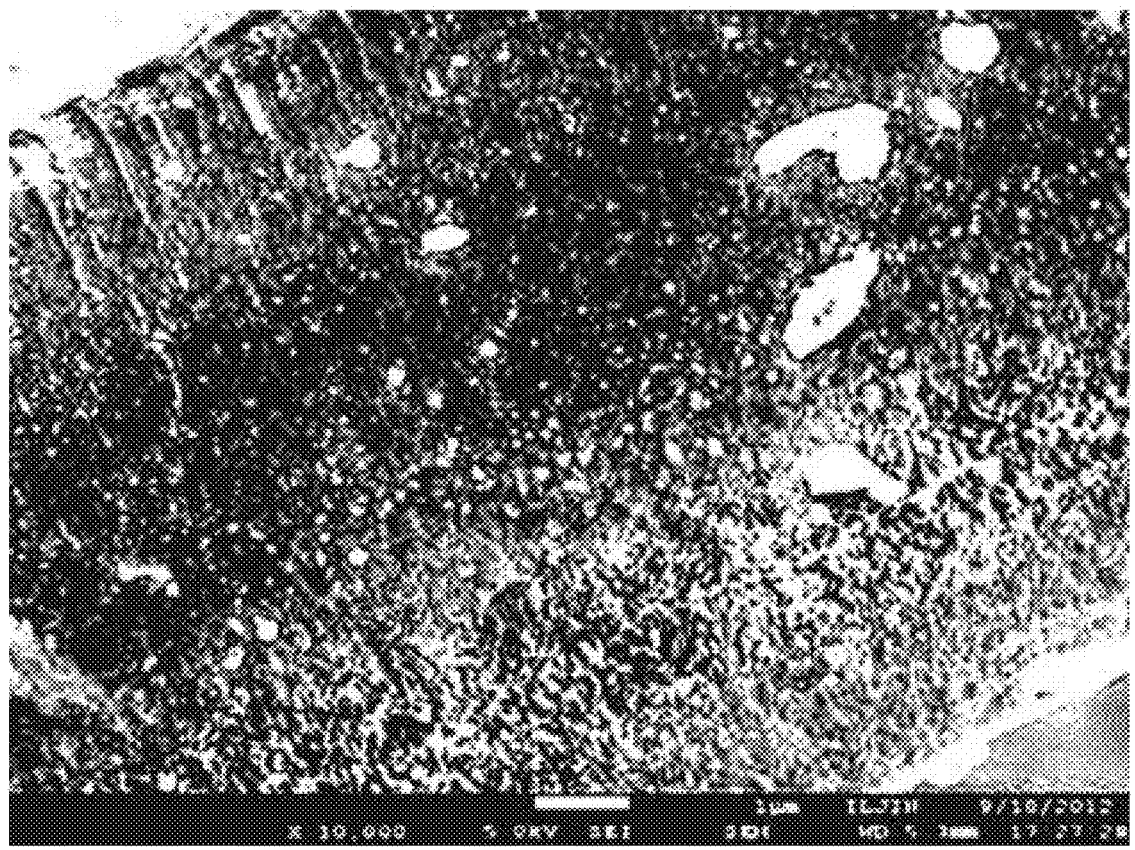

[FIG. 1C]
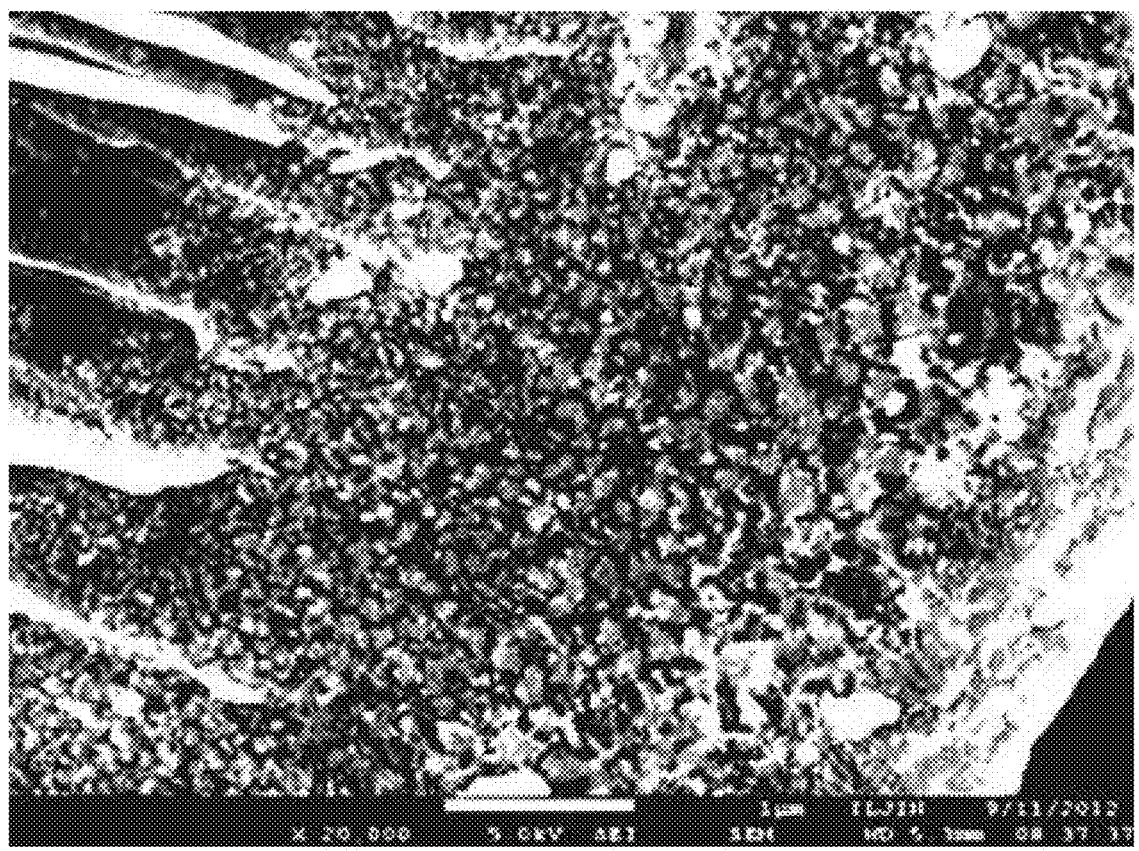

[FIG. 1D]
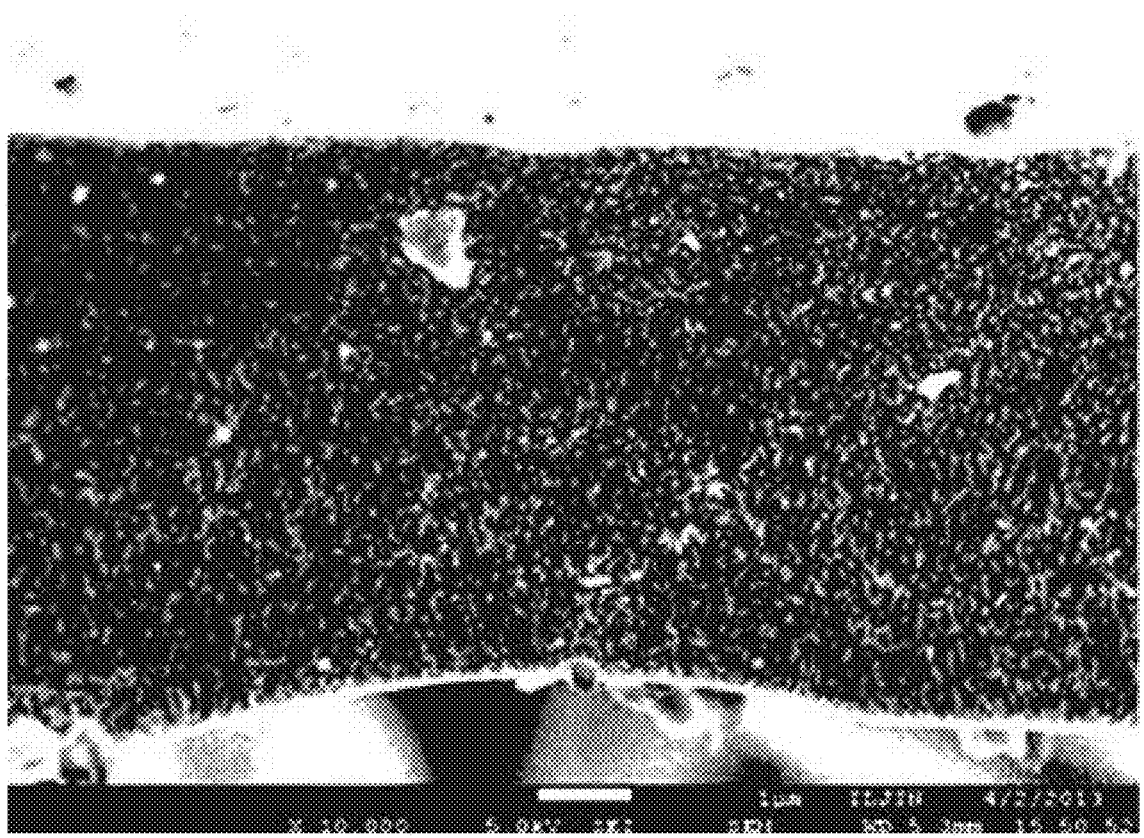

[FIG. 1E]
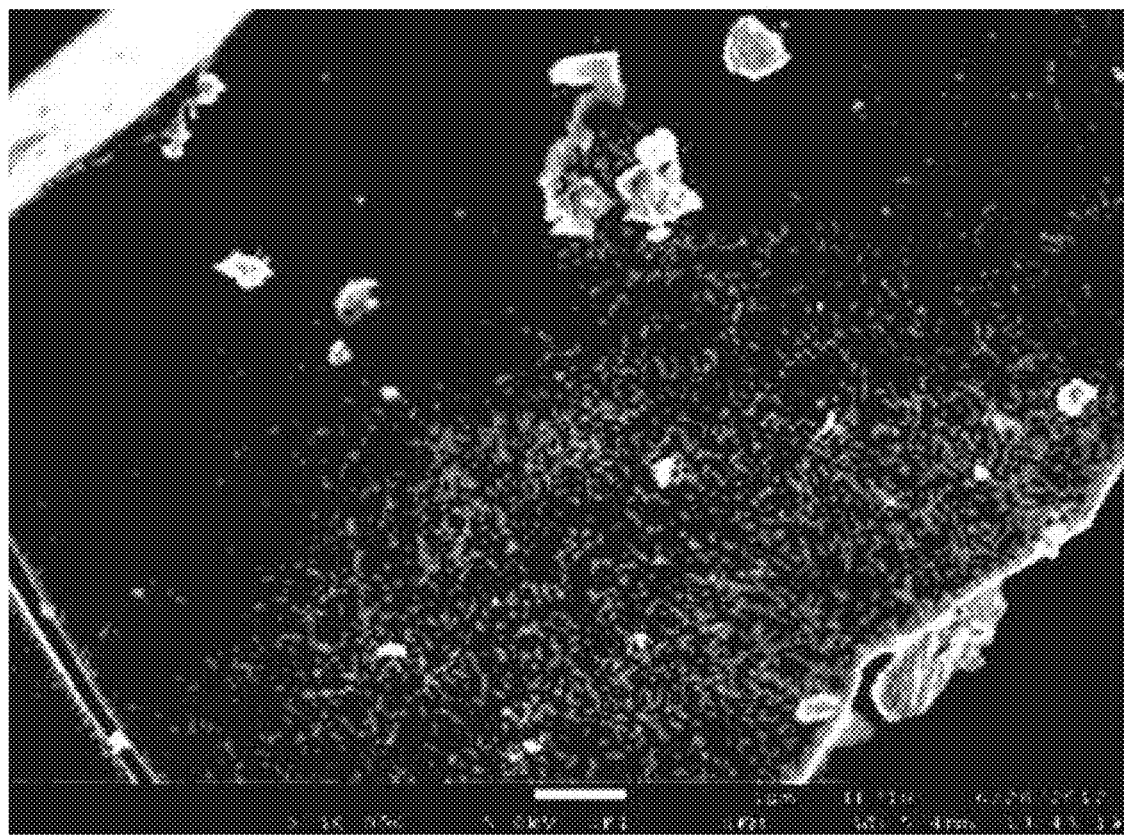

[FIG. 1F]
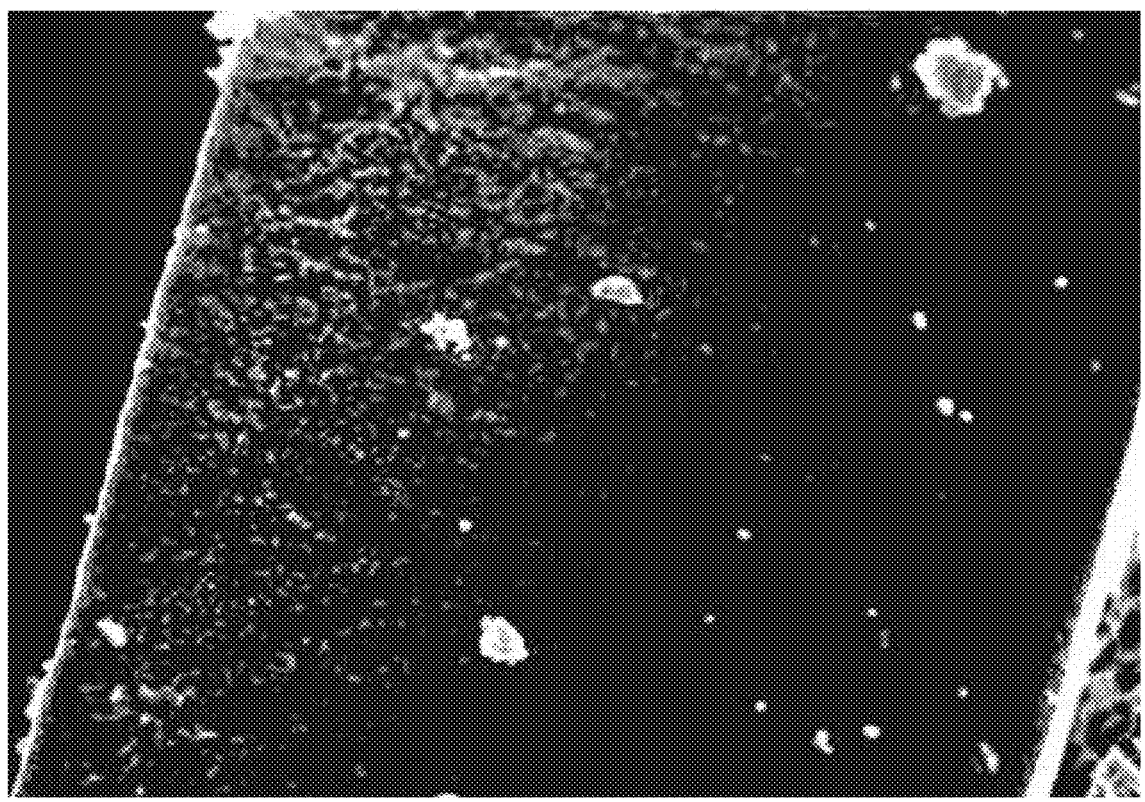

[FIG. 1G]
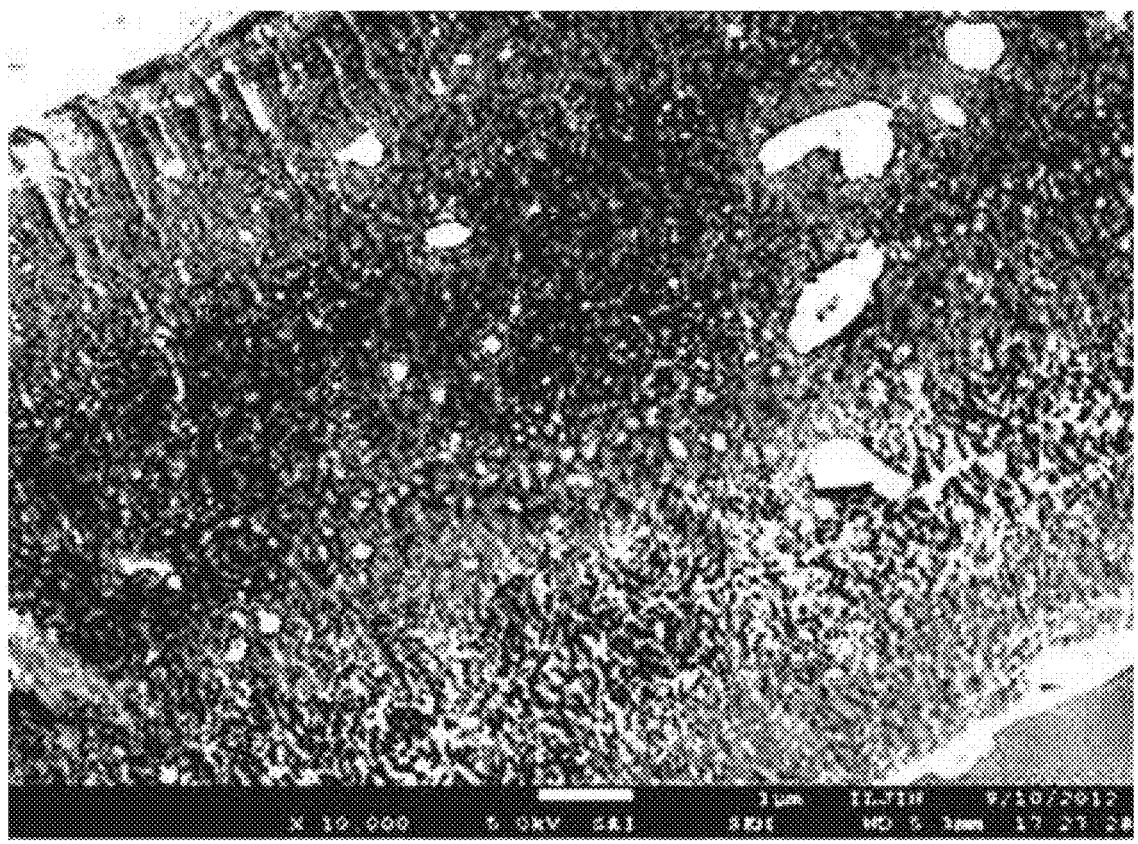

[FIG. 2A]
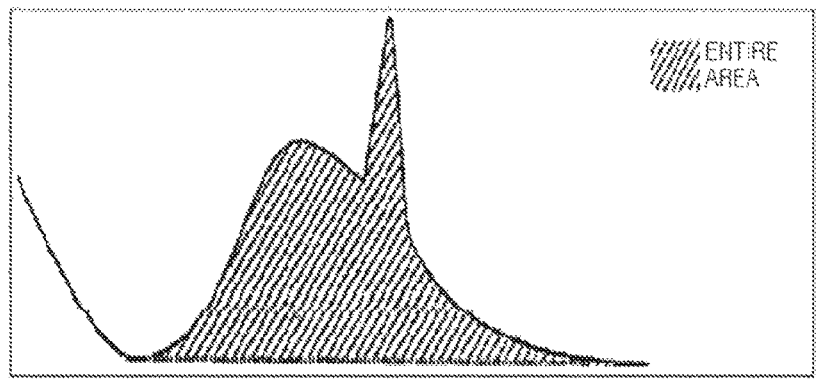
[FIG. 2B]
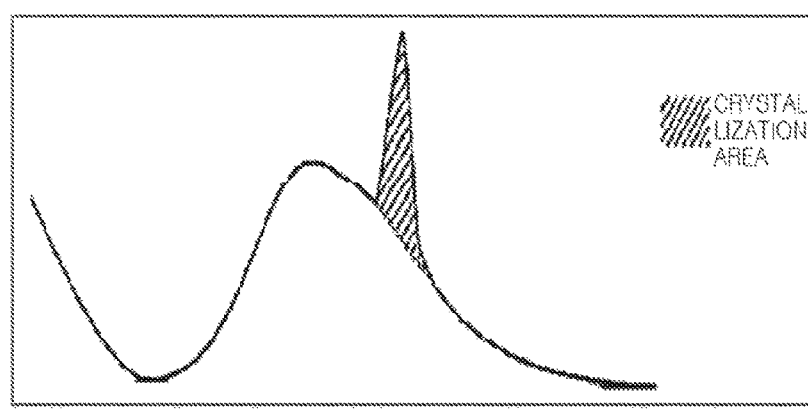
[FIG.3]
| TYPE | COMPOSITION OF ACTIVE MATERIAL | DEGREE OF AMORPHIZATION |
|---|---|---|
| EXAMPLE 1 | $Si_{70}Ti_{12.5}Fe_{12.5}Cu_5$ | 46.0% |
| EXAMPLE 2 | $Si_{70}Ti_{12}Fe_{12}Cu_3Zr_1$ | 45.1% |
| EXAMPLE 3 | $Si_{70}Ti_{11}Fe_{11}Cu_3Zr_3$ | 47.5% |
| COMPARATIVE EXAMPLE 1 | $Si_{70}Ti_{13}Fe_{13}$ | 25.3% |
| COMPARATIVE EXAMPLE 2 | $Si_{70}Ti_{13.5}Fe_{13.5}Cu_3$ | 37.3% |
| COMPARATIVE EXAMPLE 3 | $Si_{70}Ti_{11.5}Fe_{11.5}Cu_1$ | 37.1% |
| COMPARATIVE EXAMPLE 4 | $Si_{70}Ti_{10}Fe_{10}Cu_5Zr_5$ | 38.4% |

[FIG.4A]
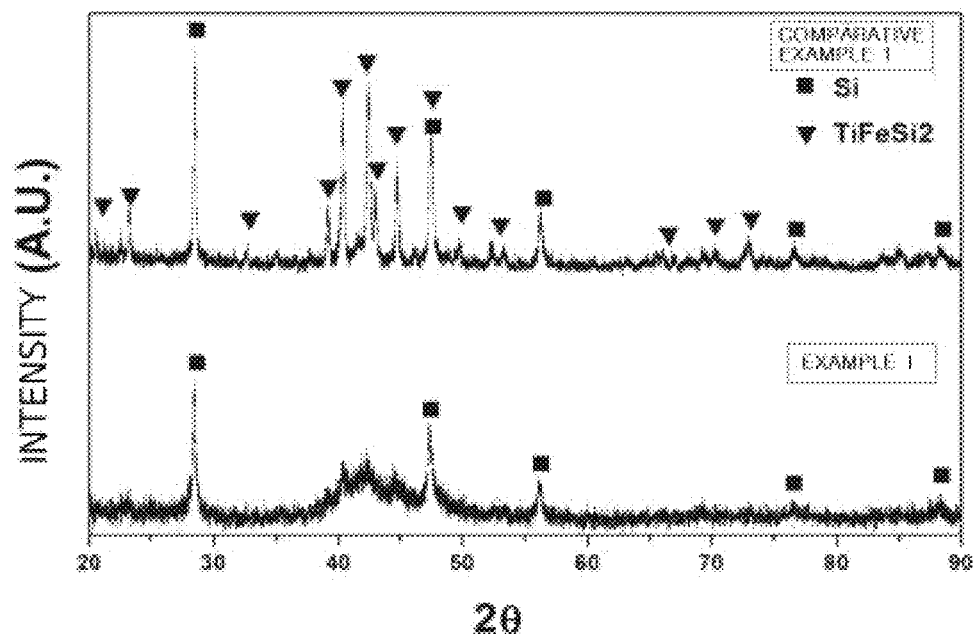
[FIG.4B]
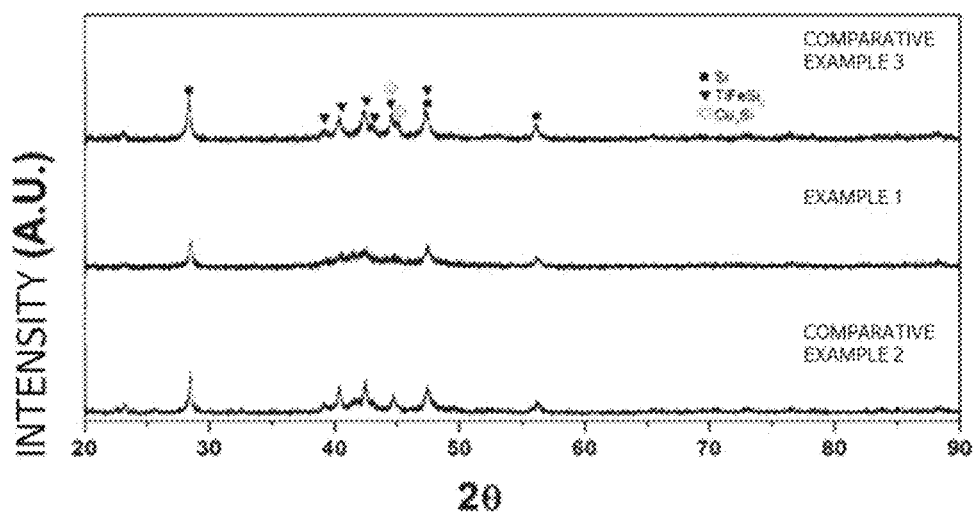

[FIG.4C]

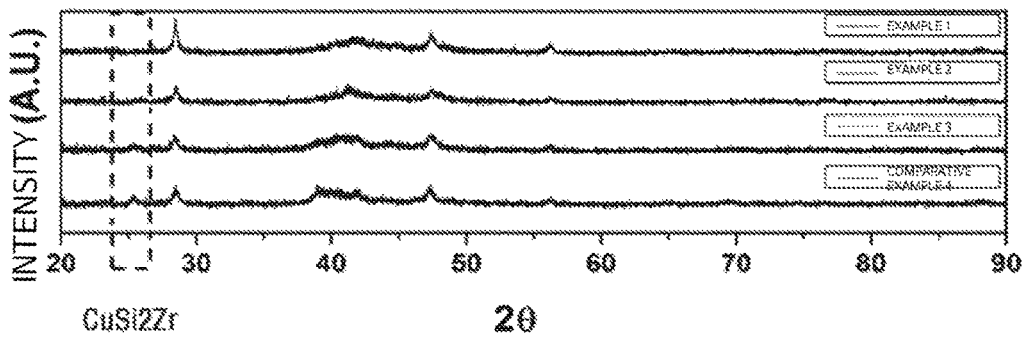

[FIG.5A]

| TYPE | COMPOSITION OF ACTIVE MATERIAL | COMPOSITION OF ELECTRODE PLATE (wt%) | | ACTIVE MATERIAL CHARGING QUANTITY (mAh/g) | ACTIVE MATERIAL DISCHARGING QUANTITY (mAh/g) | EFFICIENCY (%) |
|---|---|---|---|---|---|---|
| EXAMPLE 1-1 | $Si_{70}Ti_{12.5}Fe_{12.5}Cu_5$ | NEGATIVE ELECTRODE ACTIVE MATERIAL | 77 | 1278.7 | 1092.3 | 85.4 |
| COMPARATIVE EXAMPLE 1-1 | $Si_{70}Ti_{15}Fe_{15}$ | SFG6 GRAPHITE | 15 | 1279.2 | 1102.3 | 86.2 |
| COMPARATIVE EXAMPLE 2 | $Si_{70}Ti_{13.5}Fe_{13.5}Cu_3$ | KB CONDUCTIVE AGENT | 2 | 1214.7 | 1041.1 | 85.7 |
| COMPARATIVE EXAMPLE 3 | $Si_{70}Ti_{11.5}Fe_{11.5}Cu_7$ | PI BINDER | 6 | 1327.9 | 1142.4 | 86% |

[FIG.5B]

| TYPE | COMPOSITION OF ACTIVE MATERIAL | COMPOSITION OF ELECTRODE PLATE (wt%) | | ACTIVE MATERIAL CHARGING QUANTITY (mAh/g) | ACTIVE MATERIAL DISCHARGING QUANTITY (mAh/g) | EFFICIENCY (%) |
|---|---|---|---|---|---|---|
| EXAMPLE 1-1 | $Si_{70}Ti_{12.5}Fe_{12.5}Cu_5$ | NEGATIVE ELECTRODE ACTIVE MATERIAL | 77 | 1278.7 | 1092.3 | 85.4 |
| COMPARATIVE EXAMPLE 1-1 | $Si_{70}Ti_{15}Fe_{15}$ | SFG6 GRAPHITE | 15 | 1279.2 | 1102.3 | 86.2 |
| COMPARATIVE EXAMPLE 2 | $Si_{70}Ti_{13.5}Fe_{13.5}Cu_3$ | KB CONDUCTIVE | 2 | 1214.7 | 1041.1 | 85.7 |
| COMPARATIVE EXAMPLE 3 | $Si_{70}Ti_{11.5}Fe_{11.5}Cu_7$ | PI BINDER | 6 | 1327.9 | 1142.4 | 86% |

[FIG.6A]
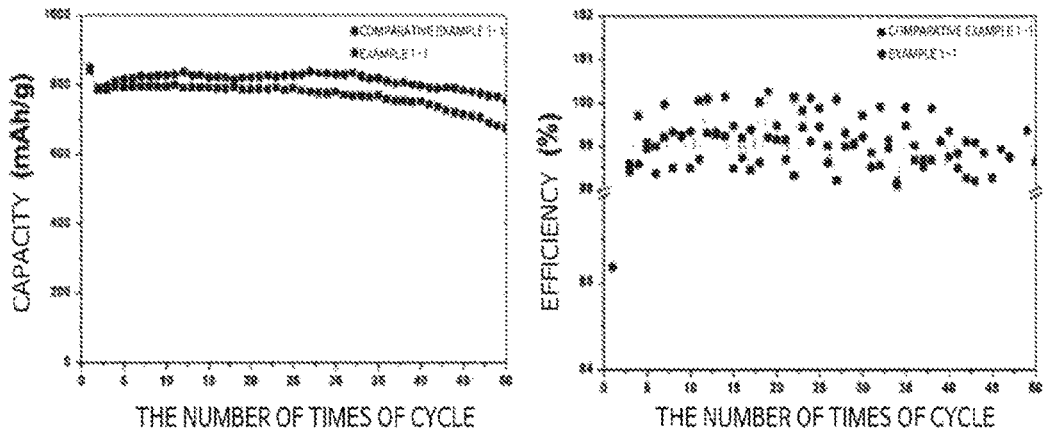
| TYPE | COMPOSITION OF ACTIVE MATERIAL | REVERSIBLE EFFICIENCY |
|---|---|---|
| COMPARATIVE EXAMPLE 1-1 | $Si_{70}Ti_{12.5}Fe_{12.5}Cu_5$ | 99.17 |
| EXAMPLE 1-1 | $Si_{70}Ti_{15}Fe_{15}$ | 98.76 |
[FIG.6B]
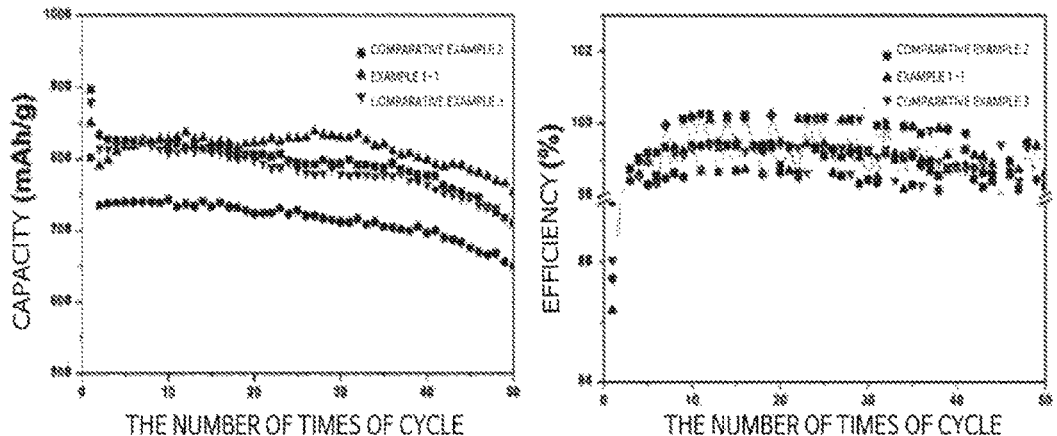
| TYPE | COMPOSITION OF ACTIVE MATERIAL | REVERSIBLE EFFICIENCY |
|---|---|---|
| EXAMPLE 1-1 | $Si_{70}Ti_{12.5}Fe_{12.5}Cu_5$ | 99.17 |
| COMPARATIVE EXAMPLE 2 | $Si_{70}Ti_{13.5}Fe_{13.5}Cu_3$ | 98.47 |
| COMPARATIVE EXAMPLE 3 | $Si_{70}Ti_{11.5}Fe_{11.5}Cu_7$ | 98.36 |

[FIG.6C]
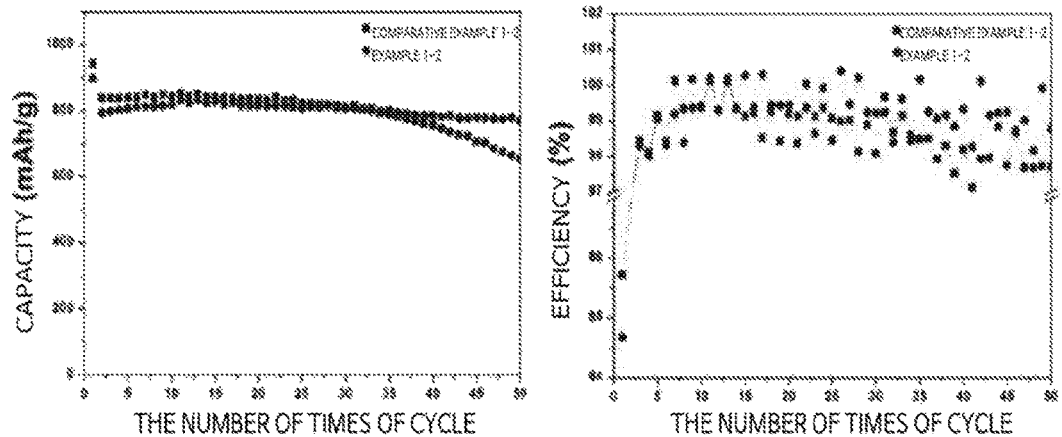
| TYPE | COMPOSITION OF ACTIVE MATERIAL | REVERSIBLE EFFICIENCY |
|---|---|---|
| EXAMPLE 1-2 | $Si_{70}Ti_{12.5}Fe_{12.5}Cu_5$ | 99.32 |
| COMPARATIVE EXAMPLE 1-2 | $Si_{70}Ti_{15}Fe_{15}$ | 98.69 |
[FIG.6D]
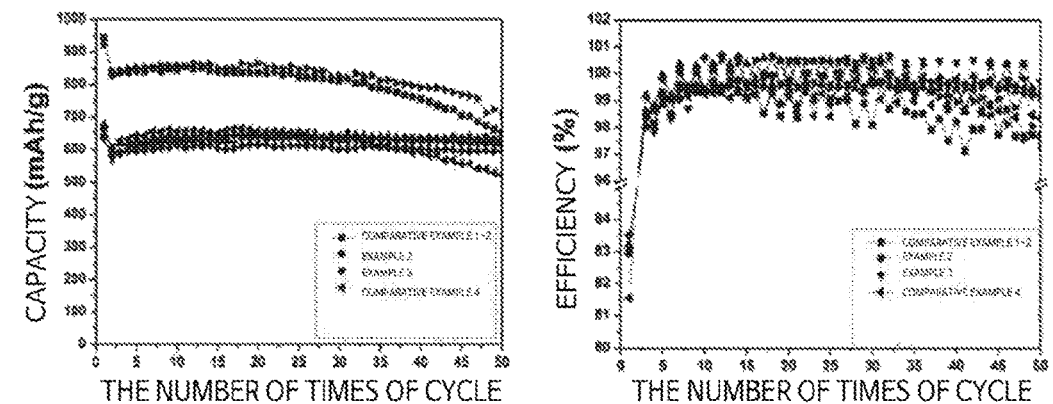
| TYPE | COMPOSITION OF ACTIVE MATERIAL | REVERSIBLE EFFICIENCY |
|---|---|---|
| EXAMPLE 2 | $Si_{70}Ti_{12}Fe_{12}Cu_5Zr_1$ | 99.67 |
| EXAMPLE 3 | $Si_{70}Ti_{11}Fe_{11}Cu_5Zr_3$ | 99.90 |
| COMPARATIVE EXAMPLE 1-2 | $Si_{70}Ti_{15}Fe_{15}$ | 98.69 |
| COMPARATIVE EXAMPLE 4 | $Si_{70}Ti_{10}Fe_{10}Cu_5Zr_5$ | 99.18 |

NEGATIVE ELECTRODE ACTIVE MATERIAL FOR LITHIUM SECONDARY BATTERY

CROSS-REFERENCE TO PRIOR APPLICATIONS

This application is a national Stage Patent Application of PCT International Patent Application No. PCT/KR2014/012088, filed on Dec. 9, 2014 under 35 U.S.C. § 371, which claims priority of Korean Patent Application No. 10-2014-0006829, filed on Jan. 20, 2014, which are all hereby incorporated by reference in their entirety.

TECHNICAL FIELD

The present invention relates to a negative electrode active material for a lithium secondary battery, and more particularly, to a negative electrode active material for a lithium secondary battery having high reversible efficiency and an excellent capacity maintaining characteristic.

BACKGROUND ART

A lithium battery in the related art uses a lithium metal as a negative electrode active material, but when a lithium metal is used, a battery is short-circuited due to formation of dendrite to cause danger of explosion, so that a carbon-based material is widely used as a negative electrode active material, instead of a lithium metal.

The carbon-based active material includes crystalline carbon, such as natural graphite and artificial graphite, and amorphous carbon, such as soft carbon and hard carbon. However, the amorphous carbon has a large capacity, but has a problem in that irreversibility is large during a charging/discharging process. Graphite is representatively used as the crystalline carbon, and has a theatrical limit capacity of 372 mAh/g, which is large, so that graphite is used as a negative electrode active material.

In order to develop a next-generation high capacity lithium battery, a development of a negative electrode active material having a high capacity beyond the capacity of graphite is essentially required. To this end, a material, which is currently and actively researched, is a silicon-based negative electrode active material. The silicon has a high capacity and a high energy density, and is capable of occluding and discharging the larger amount of lithium ions than the negative electrode active material using the carbon-based material, so that it is possible to manufacture a secondary battery having a high capacity and a high energy density.

The silicon-based active material has a problem in a volume expansion, and in order to solve the problem, a silicon alloy, which finely disperses silicon inside a parent metal, is considered as a technology having the highest probability. The representative silicon-based alloy is disclosed in Korean Patent No. 10-1263265. More particularly, the silicon-based alloy, in which silicon (Si), titanium (Ti), and iron (Fe) are mixed in a ratio of 67%:16.5%:16.5%, 70%:15%:15%, or 74%:13%:13%, is disclosed in the Patent Publication.

Although the silicon-based active material disclosed in the Patent Publication has a relatively large capacity and an improved life characteristic, but according to a rapid increase of the use of mobile devices, such as a mobile phone and a notebook computer, a silicon-based active material, which is capable of further improving a life characteristic of a secondary battery, has been continuously demanded.

DISCLOSURE

Technical Problem

An object of the present invention is to provide a negative electrode active material for a lithium secondary battery having high reversible efficiency and an excellent capacity maintaining characteristic.

Another object of the present invention is to provide a negative electrode active material for a lithium secondary battery, which is capable of implementing a secondary battery having a more improved life characteristic.

Objects of the present invention are not limited to the objects described above, and other objects that are not described will be clearly understood by a person skilled in the art from the description below.

Technical Solution

In order to achieve the aforementioned object, a negative electrode active material for a lithium secondary battery according to an exemplary embodiment of the present invention includes an alloy containing silicon (Si), titanium (Ti), and iron (Fe), in which the degree of amorphization of the alloy is raised by 40% or more by further adding copper (Cu) to the alloy.

The silicon (Si) may be contained in the alloy by 67 to 73 at %.

A ratio of the iron (Fe) to the titanium (Ti) contained in the alloy may be 1:1.

The copper (Cu) may be added to the alloy by 4 to 6 at %.

As a result of an ex situ XRD analysis of the alloy, a peak of a compound, in which silicon (Si), titanium (Ti), and iron (Fe) are combined by an integer ratio, may not be substantially observed.

The alloy may further contain zirconium (Zr) of 0.01 to 4 at %.

Other detailed matters of the exemplary embodiments are included in the detailed description and the drawings.

Advantageous Effects

The present invention has an effect in providing the negative electrode active material for a lithium secondary battery having high reversible efficiency and an excellent capacity maintaining characteristic.

The present invention has an effect in implementing a secondary battery having a more improved life characteristic.

Objects of the present invention are not limited to the objects described above, and other objects that are not described will be clearly understood by a p erson skilled in the art from the description below.

DESCRIPTION OF DRAWINGS

FIGS. 1A to 1G are SEM pictures of enlarged negative electrode active materials of Examples 1 to 3, and Comparative Examples 1 to 4.

FIGS. 2A and 2B show diagrams of an example for describing a calculation of the degree of amorphization based on an XRD pattern.

FIG. 3 is a table representing calculated degrees of amorphization of the negative electrode active materials of Examples 1 to 3, and Comparative Examples 1 to 4.

FIGS. 4A to 4C are XRD data for the negative electrode active materials of Examples 1 to 3, and Comparative Examples 1 to 4.

FIGS. 5A to 5B are tables representing an active material charging quantity, an active material discharging quantity, and initial efficiency of the negative electrode active materials of Examples 1 to 3, and Comparative Examples 1 to 4.

FIGS. 6A to 6D are graphs and tables representing a cycle life characteristic and reversible efficiency of the negative electrode active materials of Examples 1 to 3, and Comparative Examples 1 to 4.

BEST MODE

In order to achieve the aforementioned object, a negative electrode active material for a lithium secondary battery according to an exemplary embodiment of the present invention includes an alloy containing silicon (Si), titanium (Ti), and iron (Fe), in which the degree of amorphization of the alloy is raised by 40% or more by further adding copper (Cu) to the alloy.

[Mode for Carrying out the Invention]

Advantages and features of the present disclosure and methods accomplishing the advantages and features will become apparent from the following detailed description of exemplary embodiments with reference to the accompanying drawings. However, the present invention is not limited to exemplary embodiment disclosed herein but will be implemented in various forms. The exemplary embodiments are provided so that the present invention is completely disclosed, and a person of ordinary skilled in the art can fully understand the scope of the present invention. Therefore, the present invention will be defined only by the scope of the appended claims.

Respective characteristics of several exemplary embodiments of the present disclosure may be partially or entirely coupled or combined, and technically and variously connected and driven enough for those skilled in the art to fully understand, and respective exemplary embodiments may be independently carried out, and implemented together according to an associated relation.

The term "approximate" used in the present specification is used as a numerical value or a meaning close to the numerical value when an unique manufacturing and material allowable error is suggested to a mentioned meaning, and is used for preventing an unconscionable infringer from illegally using the disclosed contents including an accurate or absolute numerical value mentioned for helping the understanding of the present invention.

A unit "%" used in the present specification means "atom %" unless otherwise regulated.

The present invention provides a negative electrode active material, in which the degree of amorphization of an alloy is raised by 40% or more by further adding copper (Cu) to the alloy containing silicon (Si), titanium (Ti), and iron (Fe).

Here, the degree of amorphization is a value numerically representing the degree of amorphous region, not a crystalline region, which is included in the alloy, and as further described below, the degree of amorphization may be obtained by analyzing a result of XRD data.

In the present invention, silicon (Si) may involve in occlusion and discharge of lithium ions when a negative electrode active material is used as a battery. In the present invention, silicon (Si) may be contained in the alloy by 67 to 73 at %, but is not essentially limited thereto.

In the present invention, titanium (Ti) and iron(Fe) form a matrix, in which silicon (Si), which involves in occlusion and discharge of lithium ions, is dispersible, together with silicon (Si). Each of titanium (Ti) and iron (Fe) may be contained in the alloy by 10 to 20 at %, but is not essentially limited thereto.

In the meantime, titanium (Ti) and iron (Fe) may be added to the alloy by the ratio of 1:1.

In the present invention, copper (Cu) is added to the alloy containing silicon (Si), titanium (Ti), and iron (Fe), and suppresses the generation and the growth of a crystal during a process of the coagulation of the matrix of the alloy to serve to raise the degree of amorphization of the alloy. In the present invention, copper (Cu) may be contained in the alloy by 4 to 6 at %, but if the degree of amorphization of the alloy is raised by 40% or more, the quantity of copper (Cu) contained in the alloy is not particularly limited.

Copper is added to the alloy containing silicon (Si), titanium (Ti), and iron (Fe) to suppress the generation and the growth of amorphous $TiFeSi_2$, so that as a result of the ex situ XRD analysis of the alloy, a peak of a composition, in which silicon (Si), titanium (Ti), and iron (Fe) are combined by an integer ratio, may not be substantially observed. This means that the matrix is mainly formed as the amorphous region, not the crystalline region.

Zirconium (Zr) may be added to 0.01 to 4 at % to the alloy, other than silicon (Si), titanium (Ti), iron (Fe), and copper (Cu). Zirconium (Zr) is added to the alloy by 0.01 to 4 at % to serve to further improve reversible efficiency and a life characteristic of the alloy.

When zirconium (Zr) is excessively added to the alloy, a $CuSi_2Zr$ crystal is formed in the matrix, so that the degree of amorphization of the alloy may be less than 40%. In this case, the reversible efficiency and the life characteristic of the alloy may be degraded, so that zirconium (Zr) may be added to the alloy by an appropriate quantity, that is, 0.01 to 4 at %.

EXAMPLE 1

A method of preparing the negative electrode active material of the present invention is not particularly limited, and for example, various fine powder preparing methods (a gas atomizer method, a centrifugal gas atomizer method, a plasma atomizer method, a rotating electrode method, and a mechanical alloy method) publicly known in the art may be used.

In Example 1, a negative electrode active material having a composition of $Si_{70}Ti_{12.5}Fe_{12.5}Cu_5$ was fabricated by mixing silicon (Si), titanium (Ti), iron (Fe), and copper (Cu) by a ratio of 70%:12.5%:12.5%:5%, melting the mixture by an arc melting method and the like, and applying a single roll rapid solidification method, which disperses the melt to a rotating copper roll.

EXAMPLE 2

In Example 2, a negative electrode active material was fabricated in the same manner as that of Example 1, except that silicon (Si), titanium (Ti), iron (Fe), copper (Cu), and zirconium (Zr) were mixed by a ratio of 70%:12%:12%:5%:1%, so that the negative electrode active material had a composition of $Si_{70}Ti_{12}Fe_{12}Cu_5Zr_1$.

EXAMPLE 3

In Example 3, a negative electrode active material was fabricated in the same manner as that of Example 1, except that silicon (Si), titanium (Ti), iron (Fe), copper (Cu), and zirconium (Zr) were mixed by a ratio of 70%:11%:11%:5%:3%, so that the negative electrode active material had a composition of $Si_{70}Ti_{11}Fe_{11}Cu_5Zr_3$.

COMPARATIVE EXAMPLE 1

In Comparative Example 1, a negative electrode active material was fabricated in the same manner as that of Example 1, except that silicon (Si), titanium (Ti), and iron (Fe) were mixed by a ratio of 70%:15%:15%, so that the negative electrode active material had a composition of $Si_{70}Ti_{15}Fe_{15}$.

COMPARATIVE EXAMPLE 2

In Comparative Example 2, a negative electrode active material was fabricated in the same manner as that of Example 1, except that silicon (Si), titanium (Ti), iron (Fe), and copper (Cu) were mixed by a ratio of 70%:13.5%:13.5%:3%, so that the negative electrode active material had a composition of $Si_{70}Ti_{13.5}Fe_{13.5}Cu_3$.

COMPARATIVE EXAMPLE 3

In Comparative Example 3, a negative electrode active material was fabricated in the same manner as that of Example 1, except that silicon (Si), titanium (Ti), iron (Fe), and copper (Cu) were mixed by a ratio of 70%:11.5%:11.5%:7%, so that the negative electrode active material had a compo sition of $Si_{70}Ti_{11.5}Fe_{11.5}Cu_7$.

COMPARATIVE EXAMPLE 4

In Comparative Example 4, a negative electrode active material was fabricated in the same manner as that of Example 1, except that silicon (Si), titanium (Ti), iron (Fe), copper (Cu), and zirconium (Zr) were mixed by a ratio of 70%:10%:10%:5%:5%, so that the negative electrode active material has a composition of $Si_{70}Ti_{10}Fe_{10}Cu_5Zr_5$.
SEM Analysis A Scanning Electron Microscopy (SEM) analysis was performed on the fabricated negative electrode active material.

FIGS. 1A to 1C are SEM pictures of enlarged negative electrode active materials of Examples 1 to 3, and FIGS. 1D to 1G are SEM pictures of enlarged negative electrode active materials of Comparative Examples 1 to 4.

Referring to FIGS. 1A to 1G, it can be seen that the negative electrode active materials of Examples 1 to 3 have finer structures than those of the negative electrode active materials of Comparative Examples 1 to 4.

2. Analysis of the Degree of Amorphization

FIGS. 2A and 2B show diagrams of an example for describing a calculation of the degree of amorphization based on an XRD pattern.

The degree of amorphization may be obtained by calculating an entire area from FIG. 2A, calculating a crystallization area from FIG. 2B, and the substituting the calculated values to the formula of the degree of amorphization below.

Degree of amorphization (%)=((entire area−crystallization area)÷entire area)×100

FIG. 3 is a table representing the calculated degrees of amorphization of the negative electrode active materials of Examples 1 to 3, and Comparative Examples 1 to 4.

Referring to FIG. 3, it can be seen that the negative electrode active materials of Examples 1 to 3 have the degree of amorphization of 40% or more, and the negative electrode active materials of Comparative Examples 1 to 4 have the degree of amorphization less than 40%.

3. XRD Analysis

The Cu kαray XRD measurement were performed on the negative electrode active materials of Examples 1 to 3, and Comparative Examples 1 to 4, and the result of the measurement is represented in FIGS. 4A to 4C.

FIG. 4A represents XRD data for the negative electrode active materials of Example 1 and Comparative Example 1.

Referring to FIG. 4A, as a result of the XRD analysis for the negative electrode active materials of Example 1 and Comparative Example 1, it can be seen that a peak of $TiFeSi_2$ is observed in the negative electrode active material of Comparative Example 1, but a peak of a composition, in which silicon (Si), titanium (Ti), and iron (Fe) are combined by an integer ratio, is not substantially observed in the negative electrode active material of Example 1.

From the results of FIGS. 3 and 4A, it can be seen that when copper (Cu) is added to the alloy containing silicon (Si), titanium (Ti), and iron (Fe), the generation and the growth of the $TiFeSi_2$ crystal are suppressed, and the degree of amorphization of the negative electrode active material is raised.

FIG. 4B represents XRD data for the negative electrode active materials of Example 1 and Comparative Examples 2 and 3.

Referring to FIG. 4B, as the result of the XRD analysis for the negative electrode active materials of Example 1 and Comparative Examples 2 and 3, it can be seen that a peak of $TiFeSi_2$ or $Cu_3Si$ is observed in the negative electrode active materials of Comparative Examples 2 and 3, but other peaks, other than a peak of silicon (Si), are not substantially observed in the negative electrode active material of Example 1.

From the results of FIGS. 3 and 4B, it can be seen that only when copper (Cu) is added by an appropriate quantity, that is, 4 to 6 at %, the generation and the growth of $TiFeSi_2$ or $Cu_3Si$ crystal are suppressed, and the degree of amorphization of the negative electrode active material is raised.

FIG. 4C represents XRD data for the negative electrode active materials of Examples 1 to 3 and Comparative Example 4.

Referring to FIG. 4C, as the result of the XRD analysis for the negative electrode active materials of Examples 1 to 3 and Comparative Example 4, other peaks, other than a peak of silicon (Si), are not substantially observed in the negative electrode active materials of Examples 1 to 3, but a peak of $CuSi_2Zr$ is observed in the negative electrode active material of Comparative Example 4.

From the results of FIGS. 3 and 4C, it can be seen that only when zirconium (Zr) is added by an appropriate quantity, that is, 0.01 to 4 at %, the generation and the growth of the crystal are suppressed, and the degree of amorphization of the negative electrode active material is raised.

4. Active Material Capacity and Initial Efficiency

A coin-shaped electrode plate was manufactured by using the negative electrode active materials of Examples 1 to 3, and Comparative Examples 1 to 4, and then the charging/discharging evaluation was performed. Particularly, the electrode plates were manufactured by mixing the negative electrode active materials of Example 1 and Comparative Examples 1 to 3, conductive graphite (SFG6 graphite), a conductive agent (a KB conductive agent), and a binder (a PI-based binder) in a weight ratio of 77:15:2:6. Further, the electrode plates were manufactured by mixing the negative electrode active materials of Examples 1 to 3, and Comparative Examples 1 and 4, a conductive agent (a KB conductive agent), and a binder (a PI-based binder) in a weight ratio of 86.6:3.4:10.

The charging/discharging was performed on the manufactured electrode plates one time, and then an active material charging quantity (mAh/g), an active material discharging quantity (mAh/g), and initial efficiency (%) were measured, and the measurement result is illustrated in FIGS. 5A and 5B.

5. Cycle Life Characteristic and Reversible Efficiency

A cycle life characteristic and reversible efficiency were measured by repeating the charging/discharging 50 times at 0.5 C, and the charging/discharging method was performed under the charging/discharging method for an active material for a lithium secondary battery, which is generally and publicly known in the art.

FIGS. 6A to 6D represent a cycle life characteristic and reversible efficiency of the negative electrode active materials of Examples 1 to 3, and Comparative Examples 1 to 4 according to the aforementioned charging/discharging.

Particularly, FIGS. 6A and 6B represent cycle life characteristic and reversible efficiency of Examples and Comparative Examples listed in the table of FIG. 5A, and FIGS. 6C and 6D represent cycle life characteristic and reversible efficiency of Examples and Comparative Examples listed in the table of FIG. 5B. Reversible efficiency was drawn from an average of efficiency from the $10^{th}$ to $50^{th}$ cycle.

Referring to FIG. 6A, it can be seen that the negative electrode active material (Example 1-1), in which copper (Cu) is added by 5 at %, represents an excellent capacity maintenance characteristic (that is, a cycle life characteristic), and has high reversible efficiency, compared to the negative electrode active material (Comparative Example 1-1), which is composed of silicon (Si), titanium (Ti), and iron (Fe).

Referring to FIG. 6B, it can be seen that the negative electrode active material (Example 1-1), in which copper (Cu) is added by 5 at %, represents an excellent capacity maintenance characteristic (that is, a cycle life characteristic), and has high reversible efficiency, compared to the negative electrode active materials (Comparative Examples 2 and 3), in which copper (Cu) is added by 3 at % and 7 at %.

Referring to FIG. 6C, it can be seen that the negative electrode active material (Example 1-2), in which copper (Cu) is added by 5 at %, represents an excellent capacity maintenance characteristic (that is, a cycle life characteristic), and has high reversible efficiency, compared to the negative electrode active material (Comparative Example 1-2), which is composed of silicon (Si), titanium(Ti), and iron (Fe).

Referring to FIG. 6D, it can be seen that the negative electrode active materials (Examples 2 and 3), in which zirconium (Zr) is added by 1 at % and 3 at %, represent an excellent capacity maintenance characteristic (that is, a cycle life characteristic), and have high reversible efficiency, compared to the negative electrode active material (Comparative Example 4), in which zirconium (Zr) is added by 5 at %. Based on the result, it can be seen that when zirconium is excessively added, that is, 5 at %, reversible efficiency and a life characteristic are degraded.

Although not limited by a theory, the degree of amorphization of the negative electrode active material is raised by copper and zirconium, that is, a lot of the amorphous regions is formed in the negative electrode active material, and a volume expansion of the negative electrode active material is suppressed during the charging/discharging, and thus, a cycle life characteristic and reversible efficiency of the negative electrode active material are improved.

The exemplary embodiments of the present invention have been described in more detail with reference to the accompanying drawings, but the present invention is not essentially limited to the exemplary embodiments, and may be variously modified and carried out within the scope of the technical spirit of the present invention. Accordingly, the various exemplary embodiments disclosed herein are not intended to limit the technical spirit but describe with the true scope and spirit being indicated by the following claims. The scope of the present invention should be construed based on the following appended claims and it should be construed that the technical spirit included within the scope equivalent to the claims belongs to the present invention.

The invention claimed is:

1. A negative electrode active material for a lithium secondary battery, comprising:
    an alloy containing silicon (Si) by 67 to 73 at %, titanium (Ti) by 11 to 12.5 at %, iron (Fe) by 11 to 12.5 at %, and copper (Cu) by 4 to 6 at %,
    wherein the degree of amorphization of the alloy is raised by 40%, and wherein generation and growth of amorphous $TiFeSi_2$ is suppressed so that, in an ex situ x-ray power diffraction (XRD) plot of the alloy, a peak corresponding to a compound that contains silicon (Si), titanium (Ti), and iron (Fe) in an integer ratio is not substantially observed.

2. The negative electrode active material of claim 1, wherein the alloy further contains zirconium (Zr) of 0.01 to 4 at %.

* * * * *